United States Patent [19]

Ikezaki et al.

[11] Patent Number: 5,128,668
[45] Date of Patent: Jul. 7, 1992

[54] REMOTE-CONTROLLED ELECTRONIC EQUIPMENT WITH A TRANSMITTING FUNCTION

[75] Inventors: Masao Ikezaki, Neyagawa; Yukiko Hase, Machida, both of Japan

[73] Assignee: Matsushita Electric Industrial Co., Ltd., Osaka, Japan

[21] Appl. No.: 704,655

[22] Filed: May 20, 1991

Related U.S. Application Data

[63] Continuation of Ser. No. 388,549, Aug. 2, 1989, abandoned.

[30] Foreign Application Priority Data

Aug. 3, 1988 [JP] Japan .................. 63-194105

[51] Int. Cl.$^5$ ............................. H04B 10/00
[52] U.S. Cl. ................. 340/825.72; 359/146
[58] Field of Search .......... 340/825.24, 825.25, 340/825.69, 825.72, 310 A, 310 R; 358/86, 181, 188, 194.1; 455/4, 5, 352, 601, 603; 359/142, 143, 146

[56] References Cited

U.S. PATENT DOCUMENTS

| | | | |
|---|---|---|---|
| 4,274,082 | 6/1981 | Litz et al. | 455/352 |
| 4,386,424 | 5/1983 | Christiansen | 455/603 |
| 4,386,436 | 5/1983 | Kocher et al. | 455/151 |
| 4,509,211 | 4/1985 | Robbins | 455/603 |
| 4,598,287 | 7/1986 | Osakase et al. | 340/825.24 |
| 4,808,992 | 2/1989 | Beyers, Jr. et al. | 340/825.24 |
| 4,809,359 | 2/1989 | Dockery | 455/603 |
| 4,817,203 | 3/1989 | Tsurumoto et al. | 455/603 |
| 4,885,803 | 12/1989 | Hermann et al. | 455/603 |
| 4,897,883 | 1/1990 | Harrington | 455/603 |
| 4,989,081 | 1/1991 | Miyagawa et al. | 358/194.1 |

FOREIGN PATENT DOCUMENTS

| | | | |
|---|---|---|---|
| 0270949 | 12/1986 | Japan | 455/603 |
| 0165296 | 6/1989 | Japan | 455/603 |
| 2219164 | 11/1989 | United Kingdom | 455/603 |

*Primary Examiner*—Donald J. Yusko
*Assistant Examiner*—Dervis Magistre
*Attorney, Agent, or Firm*—Panitch Schwarze Jacobs & Nadel

[57] ABSTRACT

Remote-controlled electronic equipment with a transmitting function is disclosed which comprises a remote-control signal receiving section for receiving a remote-control signal containing a device address of a desired piece of electronic equipment to be controlled and command information on a desired instruction, and a communication section for transmitting a signal frame assembled on the basis of decoded data of the remote-control signal. Further disclosed is a remote-control signal transmitter for use in controlling the electronic equipment wherein a remote-control signal transmitted from the transmitter contains a device address of a desired piece of the electronic equipment to be controlled and command information on a desired instruction. The present invention still further provides a distributed remote-control system comprising at least two pieces of the electronic equipment mentioned above, a common remote-control signal transmitter mentioned above, and a signal transmission line for connecting the electronic equipments to each other, wherein the desired piece of the electronic equipment is either directly controlled when a remote-control signal from the remote-control signal transmitter is received by the desired piece of the electronic equipment, or indirectly controlled when the remote-control signal is received by another piece of the electronic equipment connected to the desired piece of the electronic equipment through the signal transmission line.

5 Claims, 3 Drawing Sheets

In the Case of TV

In the Case of VCR

REMOTE-CONTROLLED ELECTRONIC EQUIPMENT WITH A TRANSMITTING FUNCTION

This application is a continuation of Ser. No. 07/388,549, filed Aug. 2, 1989, now abandoned.

BACKGROUND OF THE INVENTION

1. Field of the invention

The present invention relates to remote-controlled electronic equipment with a transmitting function, which is used for a network system in which electronic equipment, for example, audio-visual (AV) equipment such as television receivers, video cassette recorders, compact disk players, and the like, can be remotely controlled by the use of only one remote-control signal transmitter.

2. Description of the prior art

FIGS. 4a and 4b show a conventional remote-control system for AV equipment, which comprises an exclusive remote-control signal transmitter corresponding to each piece of the AV equipment and a remote-control signal receiving section which is contained in each piece of the AV equipment to receive a remote-control signal from the remote-control signal transmitter. In FIG. 4a, a remote-control signal transmitter 31 is used exclusively for a television receiver (TV) 33. A remote-control signal which is transmitted by the operation of this remote-control signal transmitter 31 to control a TV 33 is received by a remote-control signal receiving section 32. Thereafter, the remote-control signal is decoded, and the TV 33 is controlled in accordance with the command information included in this remote-control signal. FIG. 4b shows the case of a video cassette recorder (VCR). In the same manner as in the case of a TV shown in FIG. 4a, a remote-control signal transmitter 34 is used exclusively for a VCR and a remote-control signal receiving section 35 contained in a VCR 36 is used exclusively for this remote-control signal transmitter, thereby allowing the VCR 36 to be remotely controlled.

Thus, the conventional remote-control system has inherent disadvantages in that remote control cannot be achieved unless a remote-control signal transmitter and a remote-control signal receiving section, both of which are exclusive for the respective pieces of AV equipment, must be provided as a pair.

SUMMARY OF THE INVENTION

The remote-controlled electronic equipment with a transmitting function of this invention, which overcomes the above-discussed and numerous other disadvantages and deficiencies of the prior art, comprises a remote-control signal receiving section for receiving a remote-control signal containing a device address of a desired piece of electronic equipment to be controlled and command information on a desired instruction, and a communication section for transmitting a signal frame assembled on the basis of decoded data of the remote-control signal.

In a preferred embodiment, the remote-control signal receiving section comprises an address comparator for comparing the device address contained in the remote-control signal with the device address of the electronic equipment which has received the remote-control signal.

In a preferred embodiment, the remote-control signal receiving section further comprises a self device address storage section for storing the device address of the electronic equipment which has received the remote-control signal.

In a preferred embodiment, an assembling section for assembling the signal frame on the basis of decoded data of the remote-control signal.

A remote-control signal transmitter of this invention which is used in controlling the electronic equipment mentioned above, wherein a remote-control signal transmitted from the transmitter contains a device address of a desired piece of electronic equipment to be controlled and command information on a desired instruction.

In a preferred embodiment, an equipment key portion for selecting a desired piece of electronic equipment to be controlled and a key matrix portion for selecting a desired instruction.

A distributed remote-control system of this invention comprises at least two pieces of the electronic equipment as mentioned above, a common remote-control signal transmitter as mentioned above, and a signal transmission line for connecting the electronic equipment to each other, wherein the desired piece of the electronic equipment is either directly controlled when a remote-control signal from the remote-control signal transmitter is received by the desired piece of the electronic equipment, or indirectly controlled when the remote-control signal is received by another piece of the electronic equipment connected to the desired piece of the electronic equipment through the signal transmission line.

In a preferred embodiment, the electronic equipment is remotely controlled by means of infrared rays.

Thus, the invention described herein makes possible the objectives of (1) providing remote-controlled electronic equipment with a transmitting function, which can be remotely controlled together with other pieces of electronic equipment by the use of only one remote-control signal transmitter; (2) providing remote-control signal transmitter by which all pieces of electronic equipment can readily be controlled through the remote-control signal receiving sections that are contained in the respective pieces of the electronic equipment, without providing remote-control signal transmitters used exclusively for different kinds of electronic equipment; and (3) providing a distributed remote-control system in which a desired piece of electronic equipment can be controlled directly or indirectly by way of other distant pieces of the electronic equipment through a signal transmission line for connecting these pieces of the electronic equipment.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
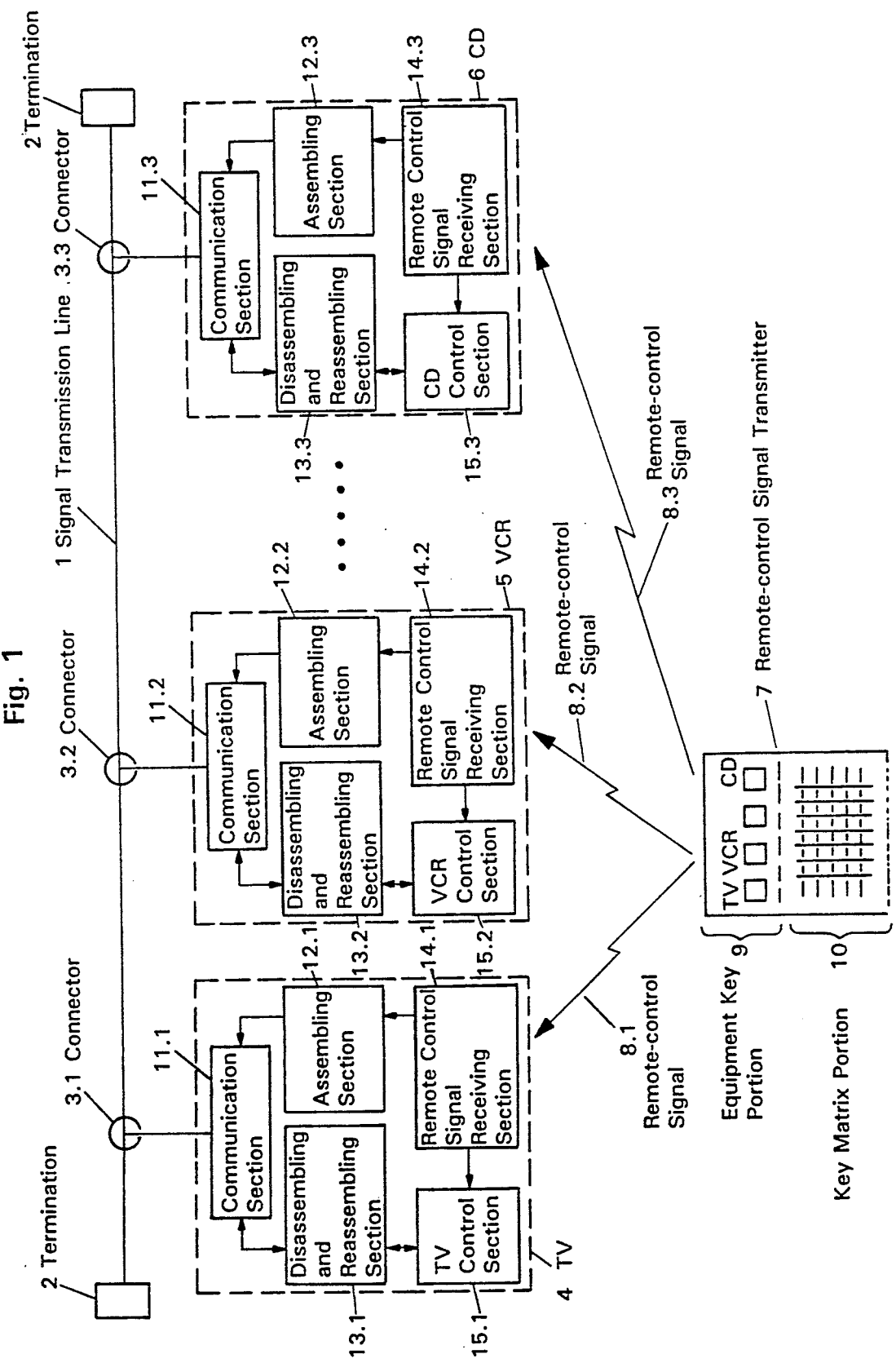
FIG. 1 is a block diagram of a distributed remote-control system comprising a plurality of remote-controlled AV equipment and a common remote-control signal transmitter of this invention.

FIG. 1 shows a configuration of a distributed remote-control system of this invention. In this figure, reference numeral 1 is a signal transmission line comprising a transmission medium which transmits communication message signals, reference numeral 2 is a termination to effect an electric termination of communication message signals on the signal transmission line 1, reference numerals 3.1-3.3 are connectors by which the communication sections 11.1-11.3 contained in the respective pieces of electronic equipment such as TV 4, VCR 5, and CD 6 are connected electrically and physically to the signal transmission line 1. Reference numeral 7 is a remote-control signal transmitter which can generate remote-control signals 8.1-8.3 and transmit them to the respective remote-control signal receiving sections 14.1-14.3 of the electronic equipment such as TV 4, VCR 5, and CD 6. The remote-control signals 8.1-8.3 generated and transmitted by this remote-control signal transmitter 7 contain a transmission data including a device address and command information. Reference numeral 9 is an equipment key portion for selecting a desired piece of the electronic equipment, which is a part of the input section of the remote-control signal transmitter 7. Reference numeral 10 is a key matrix portion, which is another part of the input section of the remote-control signal transmitter 7, for the input of data other than those for selecting a desired piece of the electronic equipment which are provided by the equipment key portion 9. Communication sections 11.1-11.3, which are contained in the respective pieces of the electronic equipment (i.e., TV 4, VCR 5, and CD 6), perform the control or process of transmitting and receiving the predetermined communication messages with each other by way of the signal transmission line 1 through the connectors 3.1-3.3. Reference numerals 12.1-12.3 are assembling sections in which input data from the remote-control signal receiving sections 14.1-14.3 are assembled into a signal format that is predefined as an input format for the communication sections 11.1-11.3. Reference numerals 13.1-13.3 are disassembling and reassembling sections in which the information on communication messages that has been received by the communication sections 11.1-11.3 through the signal transmission line 1 are dissembled to the predetermined logical units (i.e., commands) and in which the disassembled commands are reassembled into a specified sequence and then the assembled commands are fed to the equipment control section 15. The equipment control section 15 includes a TV control section 15.1 for the control of a television set, a VCR control section 15.2 for the control of a video tape recorder, and a CD control section for the control of a compact disk player.

Figure 2:
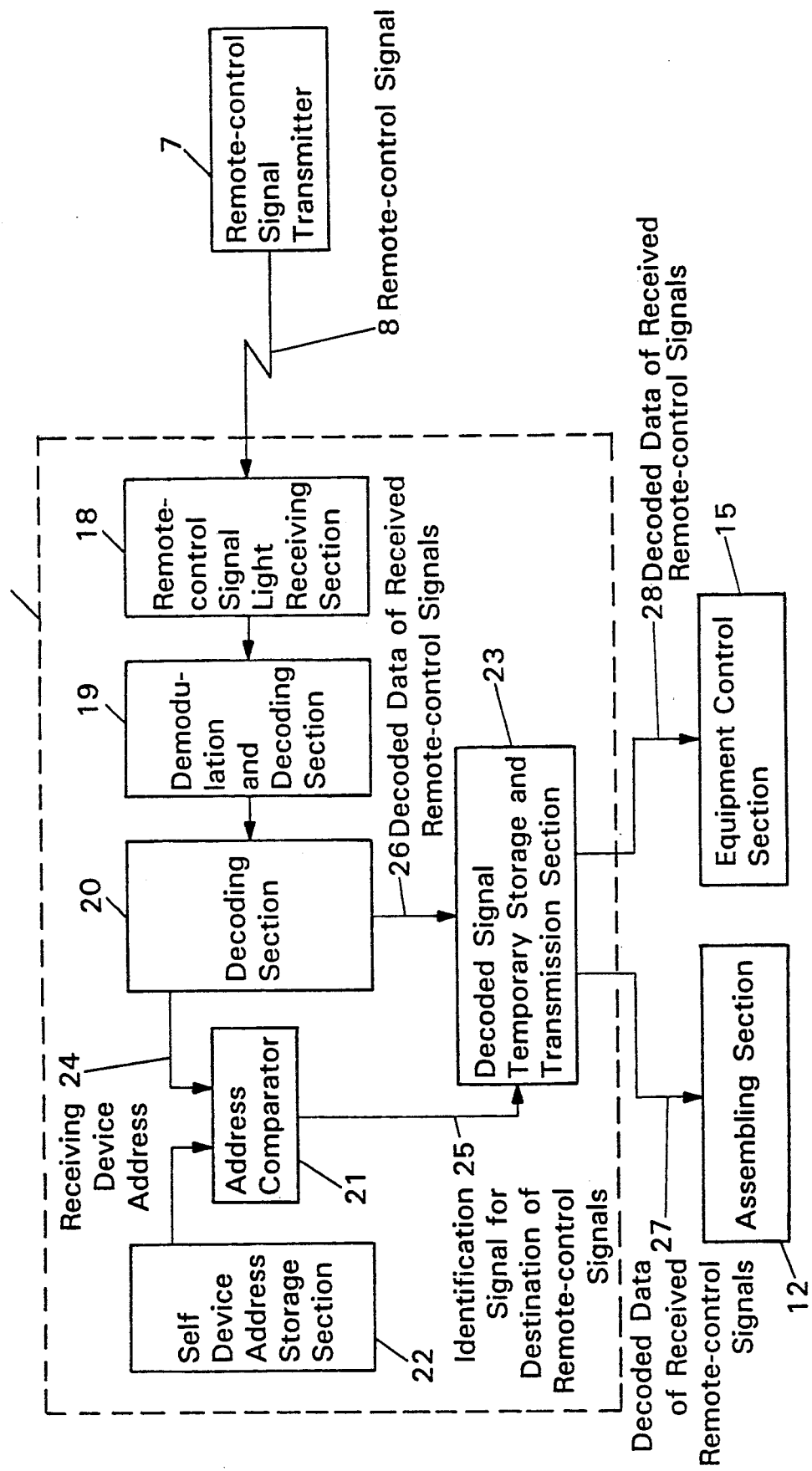
FIG. 2 is a block diagram of a remote-control signal receiving section in each piece of the AV equipment connected to the signal transmission line of FIG. 1.

FIG. 2 shows a configuration of the remote-control signal receiving sections 14.1-14.3. In this figure, reference numeral 18 is a remote-control signal light receiving section which can receive a remote-control signal 8 such as infrared rays or the like from the remote-control signal transmitter 7. Reference numeral 19 is a demodulation and decoding section which can electrically convert the input data of the remote-control signal 8 received by the remote-control signal light receiving section 18 and which can generate an input signal for the decoding section 20. In the decoding section 20, the input signal from the demodulation and decoding section 19 was disassembled and analyzed, after which a device identifier or command information contained in the remote-control signal 8 is extracted and deciphered. Thereafter, the decoding section 20 transmits necessary signals to an address comparator 21 or a decoded signal temporary storage and transmission section 23. The address comparator 21 compares the extracted value of a device address contained in the remote-control signal 8 with the stored value in a self device address storage section 22, and then sends out the results of the comparison to the decoded signal temporary storage and transmission section 23. In the decoded signal temporary storage and transmission section 23, the predetermined codes for the decipherment results of the device address or command information extracted in the decoding section 20 have been stored temporarily, and an output destination of the decoded signal stored temporarily is selected according to the input state of an identification signal 25 for destination of remote-control signals, which comes from the address comparator 21 and indicates conformity or nonconformity as a result of the above-mentioned comparison. Thereafter, the decoded signal temporary storage and transmission section 23 determines whether the decoded signal is sent out as decoded data 27 of received remote-control signals to the assembling section 12 or is sent out as decoded data 28 of received remote-control signals to the equipment control section 15.

Figure 3:
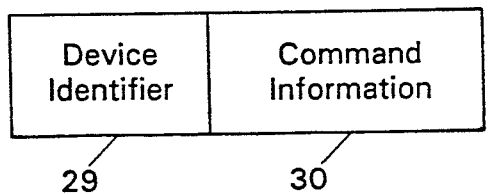
FIG. 3 is a diagram of a logical format used for remote-control signals.
Figure 4A:
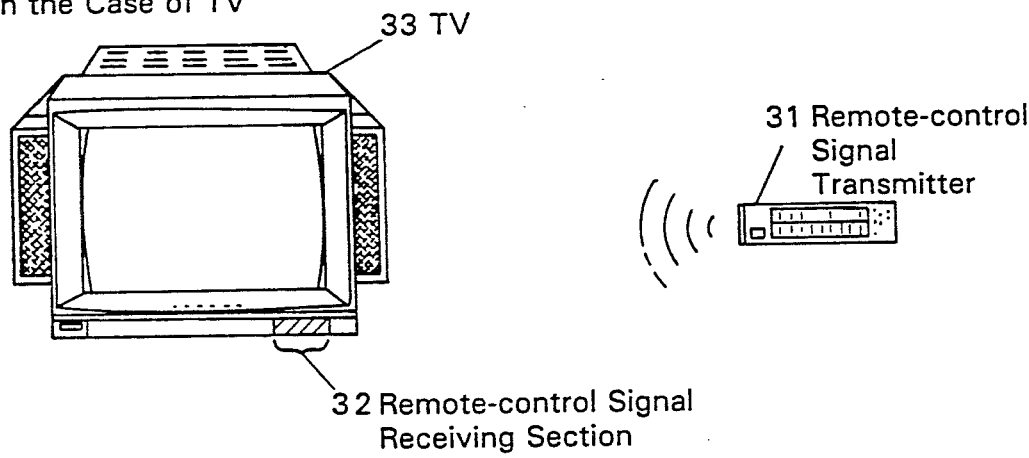
FIGS. 4a and 4b are schematic views showing a conventional remote-control system.
Figure 4B:
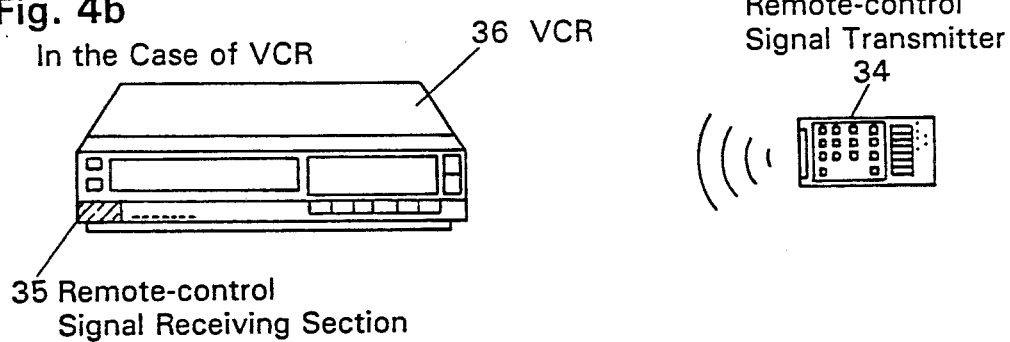

FIG. 3 shows a logical configuration of the remote-control signal 8. Reference numeral 29 is a device identifier showing a unique device address. Reference numeral 30 is command information composed of one command or a plurality of commands corresponding to the instruction which is provided by the key matrix portion 10 of the remote-control signal transmitter 7 shown in FIG. 1.

The operation of the remote-control system in such a configuration will be further illustrated by reference to the following examples.

EXAMPLES

Regarding the issuance of a command instruction for setting the VCR 5 from its "STOP" mode to its "PLAY" mode, under which the regenerating operation is started, by the use of the remote-control signal transmitter 7 shown in FIG. 1, the following two cases are considered. One is the case "A" in which a remote-control signal 8 from the remote-control signal transmitter 7 is received by the remote-control signal receiving section 14.1 of TV 4 that is different from the VCR 5 as the target of the command instruction; and the other is the case "B" in which the remote-control signal 8 is received by the remote-control signal receiving section 14.2 of the VCR 5 that is the target of the command instruction.

In the case "A", when the remote-control signal transmitter 7 generates and sends out a remote-control signal 8.1 in the logical format containing a device identifier 29 and command information 30 which are shown in FIG. 3, by selecting a "VCR" key in the equipment key portion 9 of the remote-control signal transmitter 7 and depressing a key corresponding to the command instruction "PLAY" for the VCR which has been defined and allocated in the key matrix portion 10, the remote-control signal receiving section 14.1 of the TV 4 receives the remote-control signal 8.1. At that time, the remote-control signal receiving section 14.1 performs the following process: the remote-control signals 8 such as infrared rays or the like are photoelectrically converted in the remote-control signal light receiving section 18 shown in FIG. 2, and are decoded into a digital signal format, by which the remote-control signal 8 in the logical format shown in FIG. 3 can be deciphered in the demodulation and decoding section 19. The decoding section 20 generates a device address on the basis of the data of the device identifier 29 from the data of the remote-control signals 8 which has been converted, demodulated, and decoded as mentioned above. At the same time, in the decoding section 20, the command information 30 comprising one command or a plurality of commands (only one instruction command "PLAY" in this Example) is divided into a command unit and sent out. The above two kinds of data (i.e., device address and command) extracted in the decoding section 20 are stored temporarily in the decoded signal temporary storage and transmission section 23 as decoded data 26 of received remote-control signals. They then wait for an identification signal 25 for destination of remote-control signals which is an output signal of the address comparator 21. The address comparator 21 compares the details of a self device address storage section 22 holding its own device address which has been set and stored therein with the receiving device address 24 giving the device address which has been extracted as mentioned above. The results of the comparison are given to the decoded signal temporary storage and transmission section 23 as an identification signal 25 for destination of remote-control signals. Here it is supposed that the self device address storage section 22 holds the predetermined device address of the TV 4 and that the receiving device address 24 equals to the device address of the VCR 5. At this time, a signal indicating nonconformity as output of the address comparator 21 is sent out to the decoded signal temporary storage and transmission section 23 as the identification signal 25 for destination of remote-control signals. When the identification signal 25 for destination of remote-control signals indicates nonconformity, the decoded signal temporary storage and transmission section 23 transmits the decoded data 27 of received remote-control signals, which has been stored temporarily therein, to the assembling section 12. In FIG. 1, the assembling section 12.1 assembles the decoded data 27 of received remote-control signals into the predetermined common signal format, and transmits the assembled data to the communication section 11.1 from which a signal frame is transmitted by way of the signal transmission line 1 in accordance with the predetermined communication control procedure and the predetermined communication protocol on the common signal transmission line 1. The communication section 11.2 of the VCR 5 always monitors the signal frame on the signal transmission line 1 through the connector 3.2 and determines whether or not the signal frame equals to that addressed to the VCR 5 by the use of the device address of the VCR 5. If the signal frame is in conformity, the communication section 11.2 receives all the corresponding signals. When the communication section 11.2 terminates the reception of all the signal frame successfully, the received signal frame is given to the disassembling and assembling section 13.2. The disassembling and assembling section 13.2 extracts the command information and disassembles it to obtain an instruction command "PLAY". Then, this command is sent out to the VCR control section 15.2. The VCR control section 15.2 performs the process for decipherment of the command and the subsequent control associated with the command.

In the case "B" in which the instruction "PLAY" for the VCR is received by the VCR 5, the same procedures as those in the case "A" are performed from generation and send-out of the remote-control signal 8.2 to comparison by the address comparator 21 in the remote-control signal receiving section 14.2. In the address comparator 21, the data stored in the self device address storage section 22 holding the predetermined device address of the VCR 5 is compared with the address of a piece of electronic equipment to be controlled. The address of a piece of electronic equipment to be controlled is contained in the received remote-control signal 8 and is an output corresponding to the remote-control signal 8 from the decoding section 20. Then, the decoded signal temporary storage and transmission section 23 is given a notice of conformity as a result of the comparison by means of the identification signal 25 for destination of remote-control signals. Upon reception of this notice, the decoded signal temporary storage and transmission section 23 gives the command information for the instruction "PLAY", which was received from the decoding section 20 and stored therein, to the equipment control section 15, thereby allowing the VCR control section 15.2 of the VCR 5 shown in FIG. 1 to execute the control based on the "PLAY" instruction.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. Remote-controlled electronic equipment with a transmitting function, a first receiving function for receiving a remote-control signal from a remote-control signal transmitter and a second receiving function for receiving a remote-control signal over a signal transmission line, comprising:

a remote-control signal receiving section for receiving a remote-control signal containing a device address of a desired piece of electronic equipment to be controlled and command information on a desired instruction from a remote-control signal transmitter, said remote-control signal receiving section comprising: a self device address storage section; a decoding section; an address comparator for comparing the contents of said self device address storage section with a receiving device address and for generating an identification signal identifying the destination of the remote-control signal, said identification signal indicating the conformity or nonconformity of the remote-control signal and the receiving device address; and a decoded signal temporary storage and transmission section for receiving said identification signal, for converting the remote-control signal into decoded data and temporarily storing said decoded data of the remote-control signal and for determining the destination of said decoded data temporarily stored;

a communication section connected to a signal transmission line for transmitting a signal frame assembled on the basis of nonconforming decoded data of said remote-control signal through said signal transmission line, and for receiving a signal frame assembled on the basis of nonconforming decoded data of the remote-control signal transmitted through said signal transmission line from a different piece of electronic equipment;

an assembling section for receiving the output of said remote-control signal receiving section and assembling the decoded data of the remote-control signal into a predetermined common signal format, and sending the assembled data to said communication section, thereby commanding said communication section to transmit a signal frame which includes said remote-control signal containing a device address of a desired piece of electronic equipment to be controlled and command information on a desired instruction through a signal transmission line to the desired piece of electronic equipment; and a disassembling and reassembling section for receiving a signal frame from the communication section through the signal transmission line, extracting the command information on a desired instruction from the received signal frame and using the command information to directly or indirectly control an equipment control section.

2. A remote-control signal transmitter according to claim 1, comprising an equipment key portion for selecting a desired piece of electronic equipment to be controlled and a key matrix portion for selecting a desired instruction.

3. A distributed remote-control system comprising at least two pieces of the electronic equipment of claim 1, a common remote-control signal transmitter for controlling the electronic equipment, wherein a remote-control signal transmitted from said transmitter contains a device address of a desired piece of electronic equipment to be controlled and command information on a desired instruction, and a signal transmission line for connecting said electronic equipment to each other, wherein the desired piece of said electronic equipment is either directly controlled when a remote-control signal from said remote-control signal transmitter is received by said desired piece of the electronic equipment, or indirectly controlled when the remote-control signal is received by another piece of the electronic equipment connected to said desired piece of the electronic equipment through said signal transmission line.

4. The distributed remote-control system according to claim 3, wherein said electronic equipment is remotely-controlled by means of infrared rays.

5. Remote controlled electronic equipment according to claim 1, wherein when said disassembling and reassembling section receives a signal frame from the communication section, extracts the command information on a desired instruction for a particular device address from the received signal frame, determines that the device address of the intended equipment control section is different from that of the device address of the receiving equipment control section and transmits the signal frame to the intended equipment control section.

* * * * *